Figure 1:
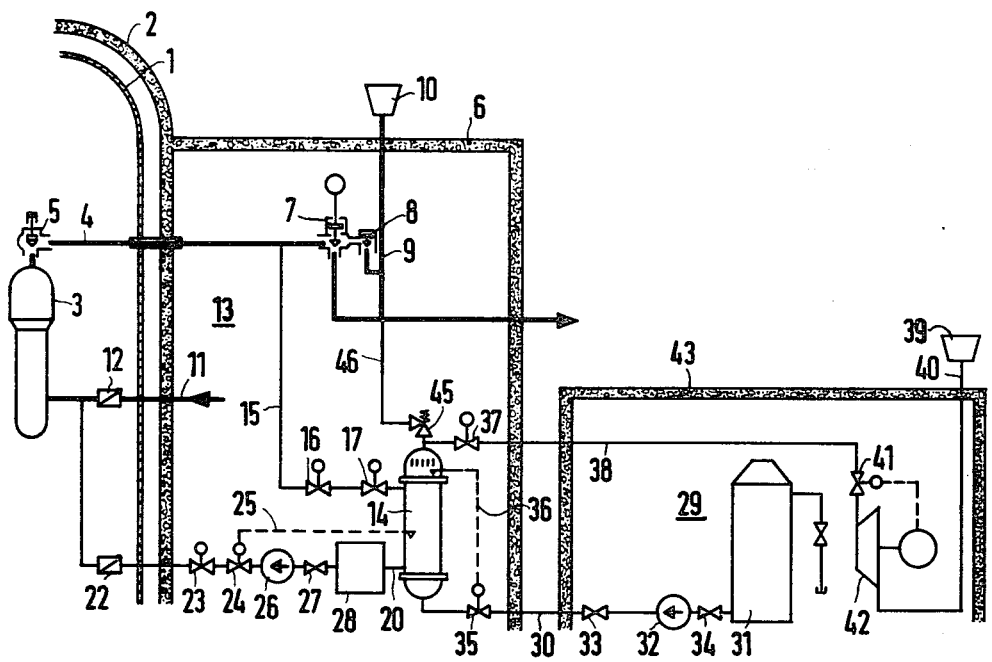

United States Patent [19]

Schabert et al.

[11] 4,138,319
[45] Feb. 6, 1979

[54] NUCLEAR REACTOR INSTALLATION WITH A LIGHT-WATER REACTOR

[75] Inventors: Hans-Peter Schabert; Bernhard Böhm, both of Erlangen, Fed. Rep. of Germany

[73] Assignee: Kraftwerk Union Aktiengesellschaft, Mülheim, Fed. Rep. of Germany

[21] Appl. No.: 746,176

[22] Filed: Nov. 30, 1976

[30] Foreign Application Priority Data

Dec. 2, 1975 [DE] Fed. Rep. of Germany ....... 2554180

[51] Int. Cl.² ........................................... G21C 15/00
[52] U.S. Cl. ........................................ 176/65; 176/87
[58] Field of Search .................... 176/62, 63, 65, 87

[56] References Cited

U.S. PATENT DOCUMENTS

| T945,008 | 4/1976 | Hassitt | 176/65 X |
|---|---|---|---|
| 3,301,761 | 1/1967 | Johnson et al. | 176/65 X |
| 3,301,762 | 1/1967 | Dahlgren | 176/65 |
| 3,528,884 | 9/1970 | Collier et al. | 176/65 X |
| 3,660,229 | 5/1972 | Klingbiel et al. | 176/65 X |
| 3,734,823 | 5/1973 | Brown et al. | 176/65 X |
| 3,847,735 | 11/1974 | Schluderberg | 176/63 X |
| 3,947,319 | 3/1976 | de Boer et al. | 176/65 |
| 3,981,770 | 9/1976 | Middleton | 176/65 X |
| 3,986,925 | 10/1976 | Radebold | 176/65 X |

Primary Examiner—Peter A. Nelson
Attorney, Agent, or Firm—Herbert L. Lerner

[57] ABSTRACT

Nuclear reactor installation with a light-water reactor includes a first heat exchanger, a primary and a secondary circulatory cooling loop connected in series through the first heat exchanger, the secondary circulatory cooling loop being a main cooling system for the installation, another secondary circulatory cooling loop operatively connected to the first heat exchanger, a second heat exchanger connected in the other secondary circulatory cooling loop for providing emergency cooling, the second heat exchanger being a steam convertor or steam-to-steam heat exchanger for producing low-pressure steam at a low-pressure side thereof having an inlet and an outlet and forming part of a third circulatory loop, a feedwater source independent of the main cooling system connected in the third circulatory loop at the inlet to the low-pressure side of the second heat exchanger, the outlet of the low-pressure side of the second heat exchanger being connected to a blow-off line leading to the open air.

2 Claims, 2 Drawing Figures

NUCLEAR REACTOR INSTALLATION WITH A LIGHT-WATER REACTOR

The invention relates to a nuclear reactor installation with a light-water reactor with two cooling loops (primary and secondary loop) connected in series through a first heat exchanger, and a second heat exchanger associated with a second cooling loop (secondary loop) for emergency cooling. The amounts of heat to be removed by emergency cooling depend upon the power which the nuclear reactor installation had delivered prior to being shut down. The quantities of heat to be removed are considerable, not withstanding an immediately effective total shutdown, as the following example will show:

A pressurized-water reactor of 1300 MWe has a thermal power output of about 3800 MW. Immediately after shutdown, the amount of heat to be removed by the emergency cooling system is yet 3% of this power i.e. 114 MW. After about 1000 sec, the power to be removed has dropped to 2% or 76 MW. After 6 hours, the power yet remaining is 1% or 38 MW. In this connection, it should be noted that the power values mentioned are due to a nuclear-physical phenomenon, which can no longer be controlled or influenced by any means available in the reactor. For this reason, the amount of heat generated as decay heat must be removed by cooling, if excessive overheating of the reactor core is to be prevented. The power values mentioned are quite considerable, however, since the order of magnitude thereof corresponds, as is known to the man of even ordinary skill in the art, approximately to the rated power of entire nuclear power-generating plants of only a few years ago.

From the periodical "Atomwirtschaft" of May, 1975, page 257, a pressurized-water reactor is known which has so-called emergency condensers for emergency cooling (note FIG. 8 thereof). The emergency condensers, in parallel with the turbine and the turbine condenseer, are connected to the steam generators of the pressurized-water reactor, so that, in case of an emergency, the steam generated therein may be condensed. The emergency condensers are cooled with water of the so-called nuclear intermediate circulatory cooling loop. The amount of water required for this purpose, however, is relatively large, because the heatings that are permissible are very limited due to environmental requirements. One can expect 1.5 to 3 tons per hour for each MW of thermal power. Add to this that the nuclear intermediate circulatory cooling loop in the conventional nuclear reactor installations depends upon river water, the flow of which may be disrupted.

In contrast to the heretofore known state of the art, it is therefore an object of the invention to provide a nuclear reactor installation with an independent heat sink which can be used at least in the case of an emergency, which requires less water and does not depend upon river water circulatory loops which have been provided for the turbine condenser or, heretofore, also for emergency or after-cooling. The separation of the primary cooling water from the ambient atmosphere by means of two series-connected heat exchangers (barriers) is thereby to be maintained.

With the foregoing and other objects in view, there is provided, in accordance with the invention, a nuclear reactor installation with a light-water reactor comprising a first heat exchanger, a primary and a secondary circulatory cooling loop connected in series through the first heat exchanger, the secondary circulatory cooling loop being a main cooling system for the installation, another secondary circulatory cooling loop operatively connected to the first heat exchanger, a second heat exchanger connected in the other secondary circulatory cooling loop for providing emergency cooling, the second heat exchange being a steam convertor or steam-to-steam heat exchanger for producing low-pressure steam at a low-pressure side thereof having an inlet and an outlet and forming part of a third circulatory loop, a feedwater source independent of the main cooling system connected in the third circulatory loop at the inlet to the low-pressure side of the second heat exchanger, the outlet of the low-pressure side of the second heat exchanger being connected to a blow-off line leading to the open air. The atmosphere is accordingly used as a heat sink. One need not therefore be committed to river-water cooling. Only the amount of feedwater to be vaporized directly in the steam-to-steam heat exchanger need then be obtained as the required water. This amount, however, is only about 1/10 of the otherwise required amount of cooling water and can therefore be obtained also from sources other than those that could heretofore be considered. A contributing factor thereto is that low-pressure steam, with respect to the mass thereof, can remove more energy than high-pressure steam. The vaporization enthalpy can be almost 50% greater than with the steam pressures conventional for normal operation.

In accordance with a preferred embodiment of the invention, the steam convertor generates saturated steam with a pressure of 3 to 12 bar, which serves to drive a turbine. The turbine, which operates, in particular, with atmospheric back pressure utilizes the energy removed with the emergency cooling to supply the drive energies necessary for the enerby removal. In particular, the turbine may deliver driving power or energy for the pumps required to operate the emergency cooling system. This can be done directly i.e. the turbine drives mechanical pumps which supply the steam-to-steam heat exchanger (the second heat exchanger) but particularly, the steam generator (the first heat exchanger), with feedwater, by returning the cooling water from the steam-to-steam heat exchanger to the steam generator. The output pressure of the pumps should in this case be lower than 15 bar. The turbine may also be coupled to a generator, however, which, in turn, energizes electric motors for driving pumps, etc. This results generally in more advantageous control possibilities. In some cases, it may be possible to reduce the otherwise necessary energy generation by emergency diesel engines, or to eliminate it altogether, by means of such a generator.

Beacause of the small specific consumption, the feedwater source for the steam-to-steam heat exchanger can be a storage tank, in accordance with a further feature of the invention. Thus, the amount of water required for several days can advantageously be made available, for example, in the form of a storage tank, that had already been provided for the primary water of the light-water reactor, it being assumable, in the case of a pressurized-water reactor, it is not necessary to replenish deionate as additional primary water for the case of emergency cooling. For shutting-down, only a relatively small quantity of deionate is required to make up for the volume contraction.

In accordance with an additional feature of the invention, the feedwater source is a well located in the nuclear reactor installation supplying water at a rate of 0.5 to 0.05 tons/hour per MW of thermal reactor power. Such wells are relatively inexpensive structures and ensure a partial diversity of the cooling system due to their independence of the river water. Because of the location thereof within the nuclear reactor installation, they are also protected against disturbances from the outside. In addition, security can be enchanced further by providing several wells in a redundant disposition.

In accordance with yet another feature of the invention, the steam-to-steam heat exchanger has a blowdown line to prevent rapid soiling or contamination. For this purpose, a counterflow heat exchanger for cooling the discharged blowdown water is recommended, so that the permissible heating of the discharged water to temperatures of 30 to 40° C., for example, can be maintained reliably.

The steam-to-steam heat exchanger provided in accordance with the invention can be constructed with two considerations in mind. On the one hand, a steam-to-steam heat exchanger can be provided which is large enough that rapid cooling of the pressurized-water reactor can be achieved, because the heat removal considerably exceeds the heat production. Thereby, the nuclear reactor installation is shut down intentionally. With this shutdown prodecure, however, one must take into consideration that too rapid a cooling rate can make the reactor critical again due to the temperature coefficient of the reactivity. For this reason, control of the heat throughput through the steam-to-steam heat exchanger is necessary. As has been found, it is advantageous for this purpose and in accordance with a further feature of the invention to provide a condensate tank and a device for controlling the condensate level in the steam-to-steam heat exchanger on the condenser side of the steam-to-steam heat exchanger. By means of the condensate level, the active heating surface can be regulated and, thereby, also the heat transfer. What is achievable thereby, in particular, is that the steam-to-steam heat exchanger is completely filled with water at the start of the operation thereof, thereby eliminating condensate shocks, which would otherwise have been a certainty whenever steam entered a cold steam-to-steam heat exchanger.

Another possibility is to construct the steam-to-steam heat exchanger only for the thermal power existing in the emergency cooling situation and, specifically, in such a manner that, at the highest temperatures of the steam feeding the steam-to-steam heat exchanger, the cooling capacity of the steam-to-steam heat exchanger is insufficient to effect a cooling of the primary circulatory loop of the reactor leading into the critical range. Cooling to a given temperature limit then generally takes longer, but in return, one can dispense with limitations of the heat transfer e.g. with devices for regulating the condensate level.

In accordance with an additional feature of the invention, the components of the third circulatory cooling loop belonging to the steam-to-steam heat exchanger are disposed in at least one mechanically strong and sturdy bunker, so that the functioning thereof cannot become questionable due to external effects such as an airplane crash, for example. Although such bunker constructions may be known per se, as shown, for example, in the aforementioned periodical, the invention of the instant application nevertheless provides a special advantage, because a considerable reduction of the construction costs can be expected because of the difference is size between the steam-to-steam heat exchanger provided according to the invention and the heretofore known condensers.

In accordance with a concomitant feature of the invention, the steam-to-steam heat exchanger, which conventionally has a tube system for conducting one medium, is employed so that the tertiary medium i.e. the medium to be vaporized, is passed through the tubes, because, then, a possibility of cleaning exists, thereby permitting the use of relatively "dirty" feed water. Other features which are considered as characteristic for the invention are set forth in the appended claims.

Although the invention is illustrated and described herein as embodied in a nuclear reactor installation with a light-water reactor, it is nevertheless not intended to be limited to the details shown, since various modifications and structural changes may be made therein without departing from the spirit of the invention and within the scope and range of equivalents of the claims.

Figure 2:
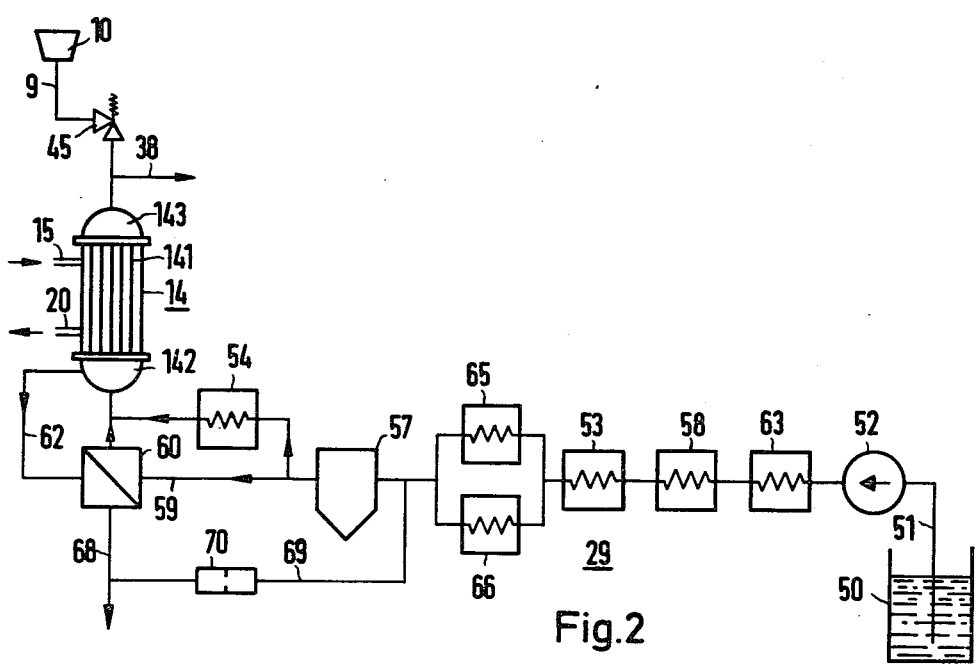

The construction and method of operation of the invention, however, together with additional objects and advantages thereof will be best understood from the following description of specific embodiments when read in connection with the accompanying drawings, in which:

FIG. 1 is a schematic view, partly diagrammatic of one embodiment of a nuclear reactor installation with a pressurized-water reactor and a steam convertor or steam-to-steam heat exchanger serving for emergency cooling; and FIG. 2 is a somewhat enlarged fragmentary view of FIG. 1 showing a modified steam covertor or steam-to-steam heat exchanger and associated cooling loops.

Referring now to the drawing and first, particularly, to FIG. 1 thereof, there is shown, disposed in a containment vessel 1 formed of steel, for example, and surrounded by a secondary shield 2 of concrete, a primary system of a pressurized-water reactor for, 3000 $MW_{th}$, for example. This thermal power is generated in a non-illustrated reactor pressure vessel, and is removed in a manner by a primary cooling loop including a steam generator 3. The steam generator 3 is a heat exchanger which is heated on the primary side thereof by the pressurized water ($H_2O$) or the primary loop. The temperature at the primary side is about 300° C. and the pressure about 150 bar.

On the secondary side, steam at about 80 bar and 300° C. is generated in the steam generator 3 in normal operation and is conducted from the containment 1 through a live steam line 4 provided with a fast-acting safety valve 5.

The live steam line 4 accordingly belongs to a second cooling loop 13 with normal water ($H_2O$) as coolant. The second cooling loop 13 contains a shut-off valve 7 followed by a safety valve 8 with a blow-off line 9 in a mechanically sturdy valve chamber 6 outside the secondary shield 2. The blow-off line 9 terminates in a sound absorber or muffler 10 which is located above the valve chamber 6. A section of the live steam line 4 located behind or downstream of the valve 7, in a flow direction of the live steam through the secondary cooling loop 13, leads to a non-illustrated turbine. A feedwater line 11 returns from the non-illustrated turbine through a check valve 12 to the steam generator 3, thereby completing the second cooling loop 13.

Ahead or upstream of the valve 7, a steam-to-steam heat exchanger 14 is connected to the live steam line 4 as a second heat exchanger, and is disposed in the valve chamber 6 and connected, on the primary side thereof, in series with the steam generator 3. The input line 15 branching off from the live steam line 4 contains two shut-off valves 16 and 17 connected in series on the inlet side of the steam-to-steam heat exchanger 14. An outlet line 20 of the primary side is connected to the feedwater line 11 of the steam generator 3. A check valve 22 is connected in the outlet line 20 in the interior of the containment 1.

Two shut-off or check valves 23 and 24 are located in the outlet line 20 within the bunker-type valve chamber 6 which is adjacent to the secondary shield 2. Of the two check valves 23 and 24, the valve 24 can serve for controlling or regulating the condensate or water level in the steam-to-steam heat exchanger 14. The conventional control loop required therefor is indicated by the broken operating line 25. The outlet line 20 further contains a pump 26 which can be shut off by a valve 27 and serves to return condensate collected in the steam-to-steam heat exchanger 14 to the steam generator 3. To improve the water level control, the line 20 contains a condensate tank 28.

The vaporizer side of the steam-to-steam heat exchanger 14 forms a third series-connected cooling circuit 29 of the nuclear reactor installation (tertiary loop). The third cooling circuit 29 includes a line 30 through which the steam-to-stem heat exchanger 14 is connected to a deionate tank 31 serving as a feed-water storage tank of the pressurized-water reactor. In normal operation, the deionate tank 31 supplies the deionate i.e. boric acid-free water, required for feeding into the primary loop of the pressurized-water reactor. For emergency cooling i.e. for operation of the third cooling circuit 29, the deionate can be pumped through the line 30 into the steam-to-steam heat exchanger 14 by a pump 32, which can be shut off by valves 33 and 34. Water level control in the steam-to-steam heat exchanger 14 can be performed in a conventional manner by means of a control valve 35, as is indicated by the broken operating line 36.

The outlet side of the steam-to-steam heat exchanger 14 leads through a blow-off line 38, which can be shut off by a valve 37, to an outlet 40 equipped with a sound muffler 39. A low-pressure turbine 42 is connected in the blow-off line 38, and is controlable by a control valve 41 and operated by the tertiary-side steam of the steam-to-steam heat exchanger 14 in a pressure range of, for example, 5 to 15 bar against practically atmospheric pressure, and supplied the driving power for the pumps 26 and 32. The power of the turbine 42 can be utilized, however, also for the operation of other auxiliary devices that are necessary for the operation of the emergency cooling system and are preferably accommodated in a protective bunker 43, as are the deionate tank 31 and the turbine 42. A safety valve 45 is furthermore associated with the blow-off line 38 and is mounted on the steam-to-steam heat exchanger 14 and set, for example, to a release or response pressure of 17 bar. The blow-off line 46 thereof leads into the outlet line 9 with sound muffler 10, provided for the safety valve 8.

In normal operation, the secondary side of the pressurized water reactor i.e. the second cooling loop 13, supplies steam for driving the non-illustrated operational turbine behind or downstream of the live steam line 4. If this heat sink should fail, the steam-to-steam heat exchanger 14 can be set into operation after the valve 7 is closed and the valves 16 and 17 opened. Advantageously, the steam-to-steam heat exchanger 14 is accordingly initially filled with water, so that no condensation shocks can occur. With the start-up of the pump 26, the heat transfer area is increased by lowering the water level. In the steam-to-steam heat exchanger 14, the water coming from the deionate tank 31 is vaporized, for example, at a pressure of 10 bar and temperatures of about 180° C. The steam that is produced is fed through the line 38 to the turbine 42 which drives the pumps 26 and 32. From the turbine 42, the steam escaped through the outlet 40 with the sound muffler 39 into the atmosphere, which is employed as a heat sink.

The water contained in the deionate tank 31 and consisting, for example, of about 1000 m³ thereof, ensures heat removal, for example, of 50 MW for at least 24 hours, initially, for the foregoing steam conditions, without employing additional cooling water or requiring any appreciable amounts of inergy for the operation of emergency power plants. Consquently, the cooling system according to the invention is highly suited precisely for catastrophes, for which one had sought heretofore to diminish the susceptibility of the system to trouble by increasing the structural outlay or expenditure. The inventive approach of the instant application which calls for additional low-pressure vaporization, the steam produced by which is freed to the surrounding air, making it possible to cool the nuclear reactor with little energy, in comparison, and without additional expenditure for cooling media, and without any possibility of releasing radioactivity in the process.

In FIG. 2, in the interest of simplicity, only the layout of the lines of that part of a nuclear reactor installation constructed in accordance with the invention is shown, the same reference characters being used therein for like elements of FIG. 1. The steam-to-setam heat exchanger 14 is constructed as a tube bundle-heat exchanger in FIG. 2. Its tubes 141 extend between two tube sheets or support plates from an inlet chamber 142 to an outlet chamber 143. The safety valve 45 that leads to the sound muffler 10 of the blow-off line 9 is connected to the outlet chamber 143. The line 38 leading to the turbine 42 (FIG. 1) is only indicated by an arrow in FIG. 2. The steam-to-steam heat exchanger or steam converter 14 is supplied through the line 15 from the steam generator 3 (FIG. 1). Condensate precipitated from the steam is led away through the line 20.

The feed-water for the steam developed in the steam-to-steam heat exchanger 14 comes from wells 50, which, for reliability or safety, may have a redundant disposition. A suction line 51 of a feed pump 52 extends into the well 50. The pump 52 forces the relatively cold feedwater through three heat exchangers 63, 58 and 53 at about 80 m³/h.

The heat exchanger 63 is an emergency cooler for the air of the building and for components such as pumps or measuring equipment which are needed in the case of an emergency.

The heat exchanger 58 is a so-called emergency aftercooler or recooler i.e. a cooler for heat removal after the nuclear reactor has been opened, and which is placed in operation when the fuel element exchange takes place and the normal after-cooling system is out of commission. Emergency cooling operation through the tertiary loop with the steam-to-steam heat exchanger 14 is, of course, in this case, not necessary and not possible.

The heat exchanger 53 serves to cool the water pumped through the fuel element pit, so that a reliable and safe long-term cooling of the pit is possible. The pit cooling system is independent of the river water used for normal operation. The heat-exchanger 53 is connected to two parallel-connected heat exchangers 65 and 66 which are used as coolers, respectively, for the water sprayed in the containment vessel of the reactor for the purpose of condensing steam and for the closed-circuit cooling of primary cooling water in case of the very unlikely occurrence of a small leak in the primary circulatory loop simultaneously with the development of the aforedescribed emergency cooling situation. The pipelines associated with the pumps for flushing the building and for the return of primary water are not shown in FIG. 2. Such pumps are necessary if the hypothetical small primary leak should occur, in order to maintain the primary loop filled and under pressure because, otherwise, secondary and tertiary steam production would not be possible, and in order to prevent a pressure increase in the containment vessel in spite of the small leak. If desired, both of these pumps can also be driven by the generator coupled to the turbine 42. This would permit a continuously cooling operation of the shut-down reactor for weeks without supplying Diesel oil even if the primary circulatory loop of the reactor has a leak.

The well water, warmed by about 30° C. in the heat exchangers 53, 63, 58, 65 and 66, is delivered, for the most part, for example 80% thereof, into a phosphatizing tank 57, which may be combined with filters. From the tank 57, the water is conducted, on the one hand, through a heat exchanger 54 directly to the steam-to-steam heat exchanger 14. In the heat exchanger 54, cooling water from Diesel engines, which serves for generating emergency power, can be cooled as long as the emergency generation is necessary. The water, which is warmed up in the heat exchangers 53, 65, 66 and 54 to a maximum of 70° C., is then heated up in the steam-to-steam heat exchanger 14 to vaporization as it flows through the tubes 141. The heating surface can again be controlled by the height of the condensate level, as described hereinbefore.

In parallel with the heat exchanger 54, a line 59 leads to a heat exchanger 60. In the latter, water which is tapped from the steam-to-steam heat exchanger 14 through a blowdown line 62 is cooled.

Assurance is thereby provided that the water derived from the steam-to-steam heat exchanger 14 conforms to the temperature limitation of, for example, 40° C. maximum, which is established in the interest of environmental protection by the respective approving authorities or regulatory agencies. From the heat exchanger 60, the water coming from the line 59 also flows into the tubes 141 of the steam-to-steam heat exchanger 14.

In order to maintain the hereinaforementioned temperature limitation under all conditions, a line 69 extending parallel to the steam-to-steam heat exchanger 14 and branching off ahead or upstream of the phosphatizing tank and filter 57 is additionally provided. The flow rate in the line 69 can be set by means of a throttling device 70, adjustable if necessary, so that the temperature of the water ultimately discharging from the line 68 meets the requirements of the authorities, but also utilizes the permitted warm-up time span as fully as possible.

In boiling-water reactors which, in contract to pressurized-water reactors, have no steam generators for the normal operation thereof, the invention can be applied analogously to a first stam-to-steam heat exchanger that is connected in parallel with the turbine and need be adjusted or set only for emergency cooling power. The tertiary loop provided in accordance with the invention, is then connected to the first steam-to-steam heat exchanger through a second steam-to-steam heat exchanger, which can, in turn, be supplied from a well serving as an independent feedwater source. By means of the "tertiary steam" generated in the second steam-to-steam heat exchanger, the atmosphere is then used as a heat sink without danger of radioactive contamination.

There are claimed:

1. Nuclear reactor installation with a light-water reactor comprising a first heat exchanger, a primary and a secondary circulatory cooling loop connected in series through said first heat exchanger, said secondary circulatory cooling loop being a main cooling system for the installation, another secondary circulatory cooling loop connected to said first heat exchanger, a second heat exchanger connected in said other secondary circulatory cooling loop for providing emergency cooling, said second heat exchanger being a steam converter for producing low-pressure steam at a low-pressure side thereof having an inlet and an outlet and forming part of a third circulatory loop, a feedwater source independent of said main cooling system connected in said third circulatory loop at said inlet to said low-pressure side of said second heat exchanger, said feedwater source constituting a well located within the boundary of the nuclear reactor installation and having a water feed rate of 0.5 to 0.05 tons/hour per MW of thermal reactor power, said outlet of said low-pressure side of said second heat exchanger being connected to a blow-off line leading to the open air.

2. Nuclear reactor installation according to claim 1 including additonal heat-exchangers connected in said third circulatory loop between said well and said inlet to said low-pressure side of said second heat exchanger for at least partly cooling emergency-power diesel engines, fuel-element pits, recoolers and building spray coolers.

* * * * *